COHERENT ANTENNA SWITCHING SYSTEM

INVENTOR.
EDWIN C. GATZ
BY Delbert P. Warner
ATTORNEY

Dec. 5, 1967 E. C. GATZ 3,357,019
SWITCHING SYSTEM TO MAINTAIN COHERENT TRANSMISSION FROM ALTERNATE ANTENNAS
Filed Feb. 1, 1965 3 Sheets-Sheet 3

DECISION CIRCUIT LOGIC DIAGRAM 3,357,019

SWITCHING SYSTEM TO MAINTAIN COHERENT TRANSMISSION FROM ALTERNATE ANTENNAS

Edwin C. Gatz, New Haven, Ind., assignor to International Telephone and Telegraph Corporation, New York, N.Y., a corporation of Maryland Filed Feb. 1, 1965, Ser. No. 429,515
4 Claims. (Cl. 343—100)

The present invention relates to antenna switching systems for propagating coherent signals and particularly to the provision of means for automatically switching between various antennas while maintaining phase coherence between the signals.

Modern coherent signal transmission systems require that a suitable range of directional coverage and a high degree of coherence be maintained between successive signals. Frequently, a complete range of directional coverage cannot be attained with a single antenna. One solution to this problem has been to provide multiple antennas, each designed to provide optimum coverage in a specified sector of space. The transmitter is simply connected to the proper antenna to provide the desired operation. This technique is widely used in aircraft, in spacecraft, on shipboard and related applications. If the location of the target is not known, or if the target station is moving, the proper antenna may be selected by transmitting a signal from the target and using the antennas as receiving antennas. The antenna providing the strongest received signal is then selected as the transmitting antenna. Either similar antenna "farms" may be used for transmitting and receiving, or the same "farm" may be used for both by suitable time or frequency sharing techniques.

The above-mentioned antenna switching techniques provide suitable directional coverage but are not suitable for use when a phase coherent receiver is used to track the transmitted signal, since a phase discontinuity is introduced in the transmitted signal each time a new antenna is switched to the transmitter. This phase discontinuity can "unlock" the coherent receiver and cause a loss of signal until the receiver can "reacquire" the signal. In high-performance coherent receivers the reacquisition time may be excessively long, therefore, critical systems require a continuous coherent signal for proper operation.

It is therefore, a primary object of this invention to provide for the control of switching means to make it possible to sustain coherent signals to and from successive antennas on a moving body as viewed from a remote receiver.

It is a further object of this invention to provide logic circuits responsive to signals received from a ground station to control the means for switching signals to be transmitted from one antenna to another of a rotating space vehicle.

In order to attain these and related objects, a system is provided at the space vehicle or other point where signals are to be radiated from successive antennas. This system includes means for detecting radiation from a distant body or target body on each of these antennas and for providing the signals to logic means or decision means. The logic or decision means then determines the proper instant of time to switch transmission from one antenna to another, so that a continuous coherent signal is transmitted to the target station. In order to make its determination, the decision means continuously compares the amplitudes of signals received by each pair of antennas, it compares the vector sum of the received signals on both antennas with the signals received by each antenna, and it determines the differential of the vector sum. The decision means normally maintains the antenna receiving the stronger signal for use in transmission, but as the strength of signals varies between the antennas operating as receiver antennas, it employs information derived from its logic system to generate a control signal which may be used to switch transmission from one antenna to another. This control signal is transmitted to switching means which, in response, applies the signal being transmitted to the antenna selected by the decision means.

The novel features that I consider characteristic of my invention are set forth with particularly in the appended claims. The invention itself, however, both as to its organization and its method of operation, together with additional objects and advantages thereof, will best be understood from the following description of specific embodiments when read in connection with the accompanying drawings, in which:

Figure 1:
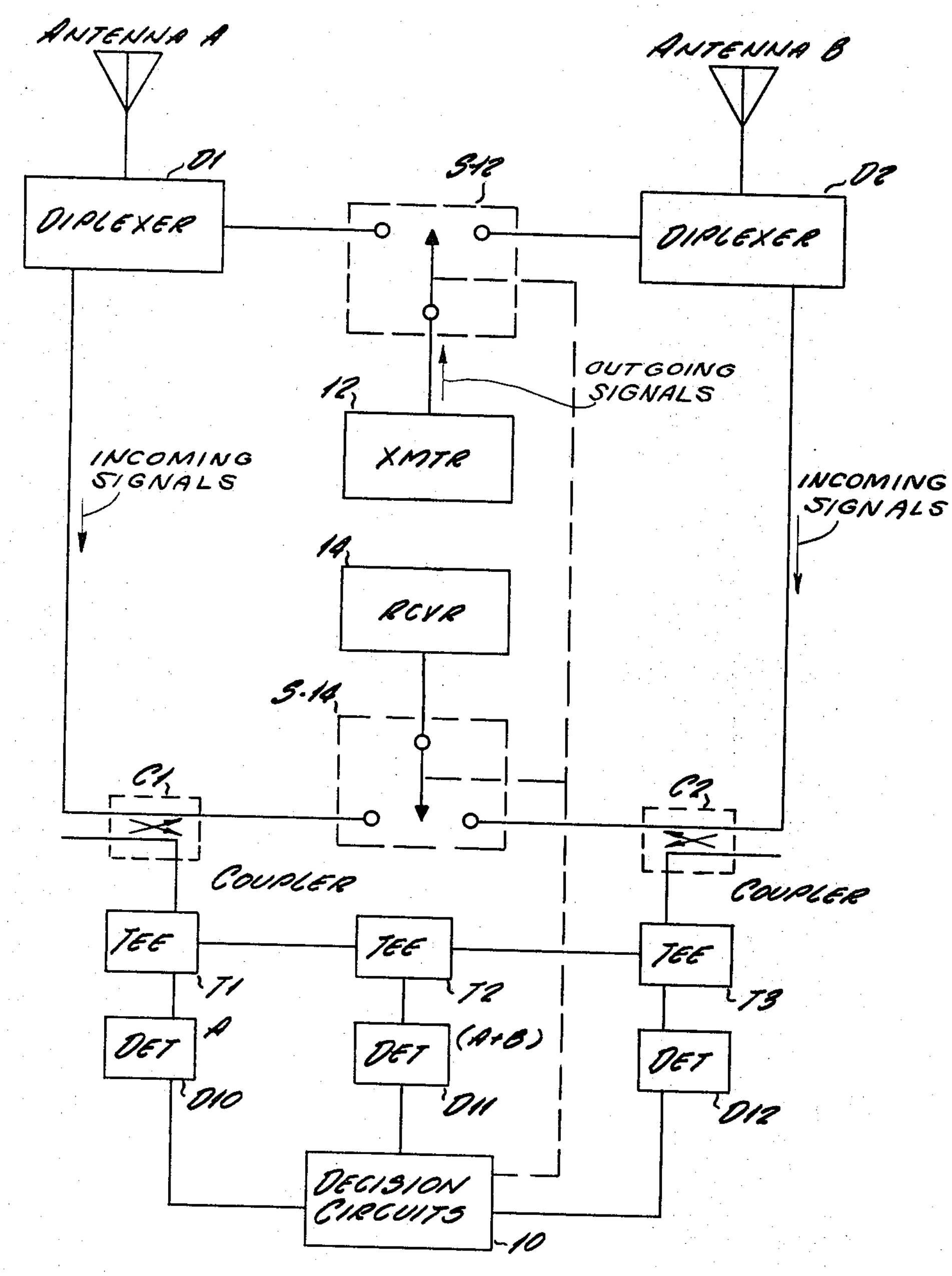
FIG. 1 is a block diagram illustrating the concept of coherent antenna switching as embodied in a preferred application of this invention.

A block diagram depicting the general concept of antenna-switching as applied in the present invention is shown in FIG. 1. It will be recognized that this concept is of general application, but discussion with relation to FIG. 1 will be limited largely to applications to spacecraft. As explained above, one technical problem to be solved is the selection of the proper antenna for use in transmission of signals, i.e. the selection between antenna A and antenna B of FIG. 1. The signals received on the two antennas will be applied through diplexers D1 and D2, through the couplers C1 and C2, and through sections of the T's indicated at T1, T2 and T3. The T's provide signals from T1 and T3 which are proportional to the signals A and B from antenna A and antenna B respectively, and from T2, a signal proportional to the vector sum, or $\overline{A+B}$, which is sometimes also written $(A+B)$ or $(\overline{A+B})$. The respective signals A, $\overline{A+B}$, and B are detected respectively by detectors D10, D11 and D12 and the resultant detected signals are supplied to the logic or decision circuits in block 10.

Figure 2B:
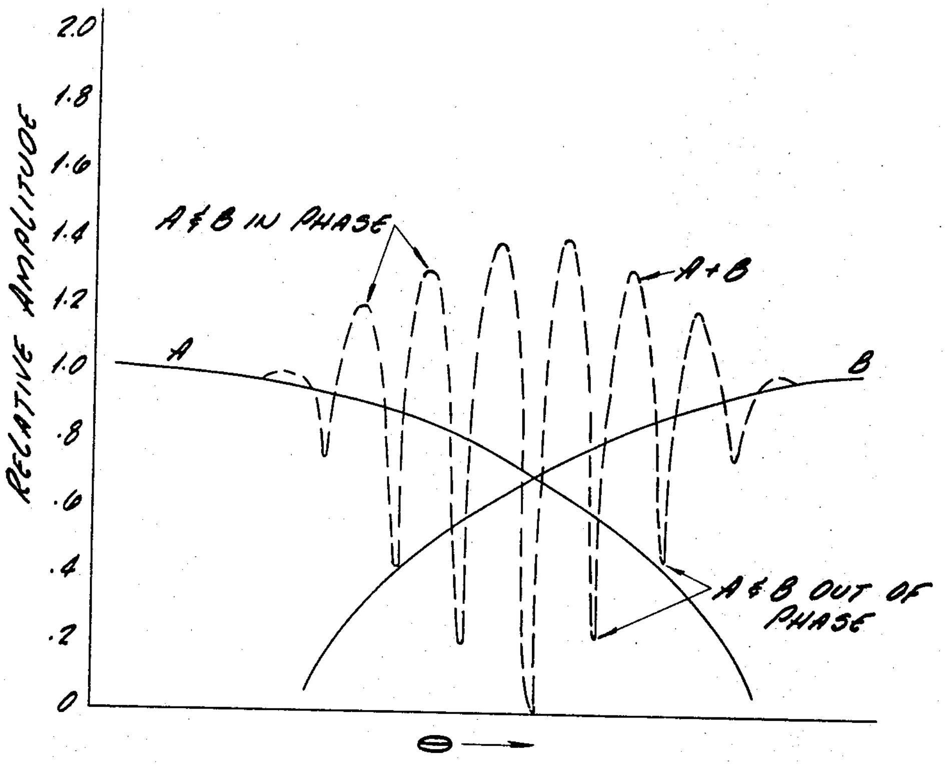
FIG. 2B illustrates typical field patterns characteristic of two selected antennas.
Figure 2A:
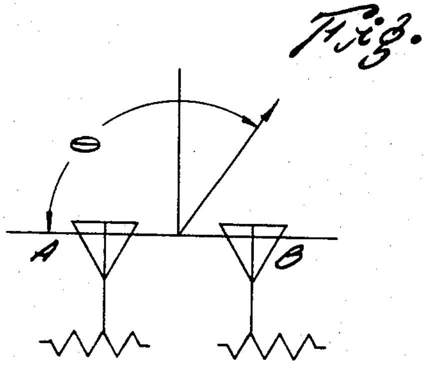
FIG. 2A illustrates a typical relationship between two antennas.

The relationship of the three signals supplied to the decision circuits 10 in a particular antenna configuration is illustrated in FIGS. 2A and 2B, as a function of $\theta$, the angle to the target station. For the sake of simplicity, the discussion relating to FIG. 2A and FIG. 2B is limited to one plane, but the arguments presented here are applicable without loss of generality to an orthogonal plane.

Although the precise form of the field patterns formed by multiple antennas depends on the antenna configuration, physical dimensions, wavelength of the signals and other factors, the general characteristics are illustrated in FIG. 2B where the overlapping patterns of antennas A and B and the typical peak-and-null interference pattern are shown in the combined $\overline{A+B}$ pattern. The interference pattern is well known to be caused by phase interference between the two signals and varies, as indicated in FIG. 2, between "in phase" conditions resulting in a pattern peak and "out-of-phase" conditions resulting in a pattern null.

It is this interference pattern in the $\overline{A+B}$ channel which enables the decision circuitry shown in an embodiment of the invention to select the proper time to actuate the transmitter and receiver antenna switches. It is evident, as the target station moves relative to the transmitting station from sector A to sector B, that it is desirable to switch when the channel B signal exceeds the channel A signal.

If the time of switching is further restricted to the time of a peak in the $\overline{A+B}$ channel, the received (and therefore the radiated) signals from both antennas will be in phase in the direction of the target station.

The necessary decision circuits are straightforward logic circuits involving a comparator between A and B, a differentiator of the channel $\overline{A+B}$ signal, and further comparators between A and $\overline{A+B}$ and between B and $\overline{A+B}$ to insure selection of a peak rather than a null in $\overline{A+B}$. The necessary conditions are summarized as follows:

$$B>A$$

and $$\overline{A+B}>A$$

and $$\overline{A+B}>B$$

and $$d/dt\overline{A+B}=0$$

A particular proposed application of this invention employs an S-band frequency for communication with a satellite. Specifically, it is proposed to switch between two low gain antennas mounted on the satellite. One or the other of these two antennas will provide adequate coverage in any direction from the spacecraft. The use of this invention will make coherent tracking possible during any maneuver or even after catastrophic failure of stabilization.

Alternatively, the system may be used to switch between high-gain antennas which are fixed or have limited steering capability. Additional low-gain antennas may also be incorporated, or switching may be accomplished among a variety of high-gain, low-gain and special purpose antennas. However, as the number of antennas is increased, the switching logic and hardware become much more complex, increasing roughly as the square of the number of antennas. Therefore, a system composed of two low-gain antennas is initially most practical and operationally useful.

Figure 3:
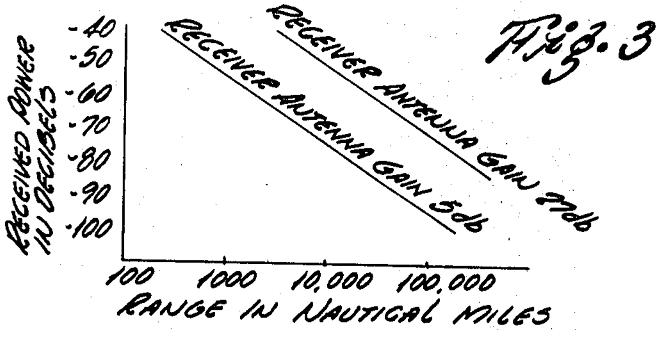
FIG. 3 is a chart illustrating typical power vs. range characteristics of an embodiment of the invention.

A typical representation of the radiated power received at a spacecraft as a function of range is plotted in FIG. 3 for the following typical parameters:

| | |
|---|---|
| Frequency | 2100 mcs. |
| Transmitter power | 10 kw. |
| Transmitting antennas (gnd.) | 30 foot dish, 40 db gain. |
| RF feed loss | 3 db. |

Curves are plotted for both 5 db and 27 db receiver antenna gain, representing a reasonable range of antenna configurations. The required detector sensitivity is dependent on this received power, the losses in couplers and T's (6 db), and the required $S/N$ ratio for decision circuits (10 db minimum).

The basic operating components of the system as illustrated in FIG. 1 indicate a connection for two antennas, A and B. This configuration is intended to represent either a complete 2-antenna system or merely two adjacent elements of a multiple-antenna system. The antennas are indicated to be coupled to the system through diplexers D1 and D2 so that they may function simultaneously as receiving and transmitting antennas. An alternative embodiment could involve separate but identical sets of antennas for transmitting and receiving. In operation, the transmitter 12 and the receiver 14 are both connected to either antenna A or antenna B through the switches S12 and S14. It will be recognized that switches S12 and S14 will, in a preferred embodiment, be electronic switches rather than mechanical switches such as have been illustrated for the sake of simplicity. As the target station moves from sector A to sector B of FIG. 2B electronic switches will be able to respond quickly enough to signals from the decision circuits which indicate the proper time to switch the transmitter and the receiver to the appropriate antenna to maintain phase coherency.

The various components necessary for an embodiment of the invention in accordance with the block diagram of FIG. 1 are well known. The necessary RF components are couplers such as are indicated at C1 and C2, T's such as T1 and T2, interconnecting lines, and the like, which are commercially available. For minimum size and weight, an integrated layout using printed circuit strip line construction might be used.

As is indicated in FIG. 1, three detectors are required for the operation of an embodiment of this invention. Consequently, the detectors should be as simple as possible, although depending on specific operational requirements, anything from a simple crystal video detector to a phase-coherent superheterodyne receiver might be desirable. Wide-band crystal video detectors, for example capable of low level microwave detection are known. A preselector filter is generally required for the detectors to eliminate adjacent channel interference, although this function may be included in the antenna diplexers. A variety of filter designs are available for this application.

Figure 4:
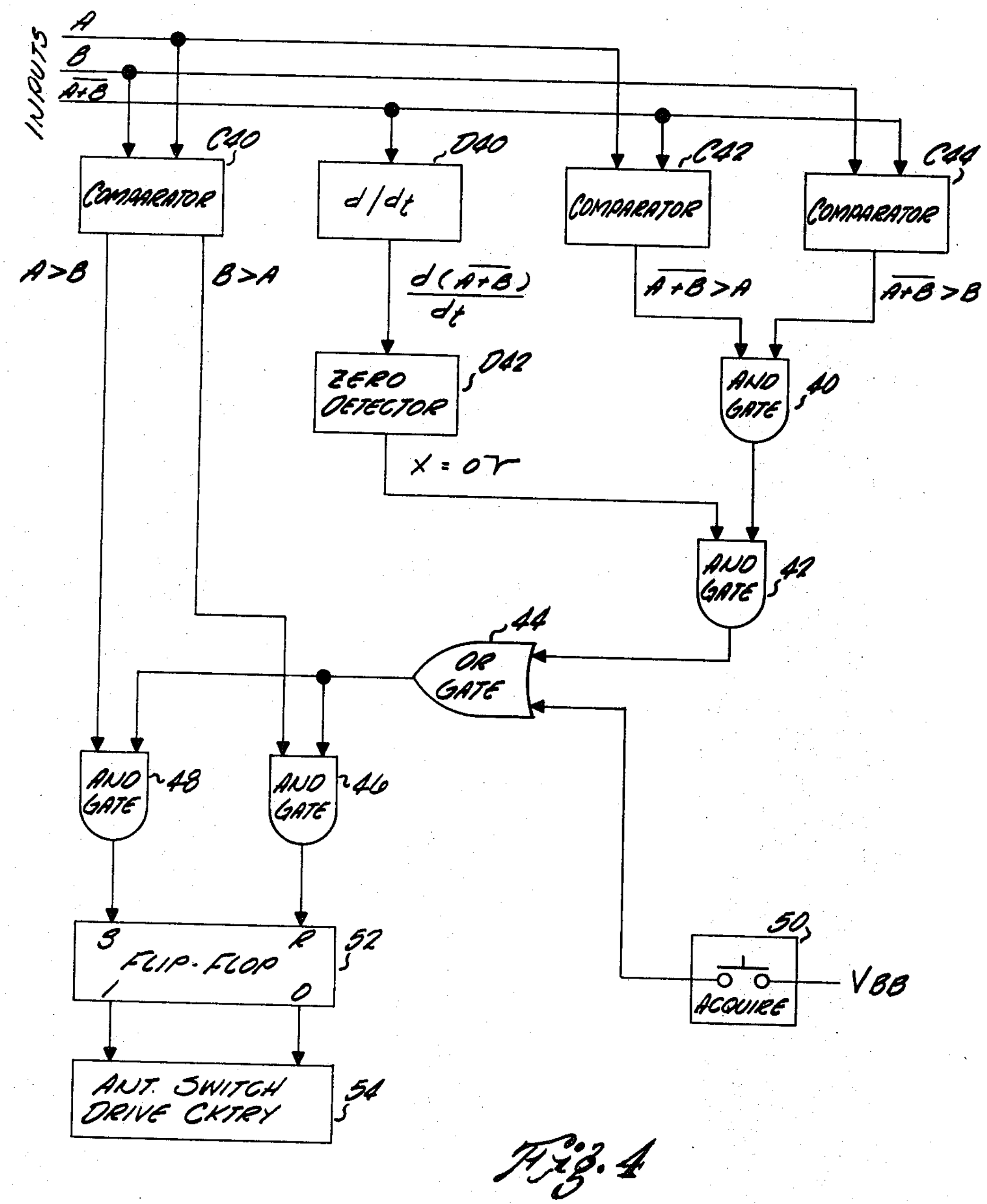
FIG. 4 is a block diagram illustrating a preferred embodiment of a decision circuit logic diagram.

Suitable decision circuits indicated by block 10 in FIG. 1 are disclosed in FIG. 4. The various blocks shown in FIG. 4 illustrate well known functions in logic circuitry requiring little or no explanation. The comparators at C40, C42 and C44 provide signals at their output terminals in accordance with the indicated logical relationships between the signals A, B and $\overline{A+B}$. The differentiator circuit at D40 provides an output proportional to the symbol shown on the output terminal of D40. When this differentiated signal passes through zero, indicating either a maximum or a minimum valve of $A+B$, a pulse is provided by a conventional zero detector D42.

The various AND and OR gates illustrated are exemplary of the manner in which the conditions imposed by the logic equations previously referred to may be complied with. For example, working backward from AND gate 46, it becomes clear that the gate 46 will supply an output pulse only if $B>A$ and if a signal is received from OR gate 44. The OR gate will receive a signal through the acquire switch 50 to be used in control of the antenna switches during periods of target "acquisition" and at such times the comparisons involved in gates feeding into AND gate 42 are not of importance. Assuming that acquisition has been made and acquisition switch 50 has been disengaged, then the inputs to AND gate 42 can be used in the logical selection between antennas to be engaged and in the selection of the time for switching between antennas. The logical criteria employed are indicated in detail in FIG. 4, where AND gate 40 provides an output if $(A+B)$ is greater than A and greater than B. Also from FIG. 4 it is apparent that the zero detector D42 provides an output pulse when the differential of $(A+B)$ is zero indicating either a maximum or minimum has been reached.

The flip-flop switch 52 in FIG. 4 is a conventional device which provides an output signal on either terminal 1 or terminal 0 depending upon whether a signal was last received at terminal S or terminal R. The flip flop 52 is then able to provide a signal which can control the antenna switch drive circuitry indicated at block 54 in accordance with whether antenna A or antenna B should be operating as the transmitting antenna. The switch drive circuitry 54 could be of a mechanical nature but solid-state devices are preferred in order to minimize size and weight.

While the principles of the invention have been described above in connection with specific apparatus and applications, it is to be understood that this description is made only by way of example and not as a limitation on the scope of the invention.

What is claimed is:

1. An antenna switching system comprising:

means, including a plurality of antennas for receiving input signals and for providing output signals proportional to the received input signals;

means for deriving additional signals proportional to the vector sums of pairs of the output signals;

a decision circuit responsive to said output signals and to the additional signals for determining which antenna is currently suited to serve as the transmitting antenna and to provide a control signal in accordance with the determination;

a source for a signal to be transmitted; and switching means responsive to said control signal to route the signal to be transmitted to the selected antenna.

2. An antenna switching system substantially as claimed in claim 1 in which the decision circuit includes:

means for determining when the sum of input signals passes through a maximum value and for providing a logic signal of use in determining the time for occurrence of said control signal.

3. An antenna switching system substantially as claimed in claim 1, in which the decision circuit includes:

means for determining when the sum of input signals passes through a maximum value and for providing a logic signal of use in determining the time for occurrence of said control signal; and means for determining when the sum of input signals is larger than either individual received signal and providing a logic signal accordingly.

4. An antenna switching system substantially as claimed in claim 1 in which the decision circuit includes:

means for determining which of the output signals is larger and providing a logic signal accordingly;

means for determining when the sum of received signals passes through a maximum value and providing a logic signal accordingly;

means for determining when the sum of received signals is larger than either individual received signal and providing a logic signal accordingly; and means for utilizing said logic signals to provide said control signal.

References Cited

UNITED STATES PATENTS 3,234,551 2/1966 Giger ------------- 343—100

RICHARD A. FARLEY, *Primary Examiner.*

CHESTER L. JUSTUS, *Examiner.*

D. C. KAUFMAN, *Assistant Examiner.*